United States Patent
Amada

(10) Patent No.: US 8,229,739 B2
(45) Date of Patent: Jul. 24, 2012

(54) SPEECH PROCESSING APPARATUS AND METHOD

(75) Inventor: Tadashi Amada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1025 days.

(21) Appl. No.: 12/176,668

(22) Filed: Jul. 21, 2008

(65) Prior Publication Data

US 2009/0043566 A1    Feb. 12, 2009

(30) Foreign Application Priority Data

Aug. 9, 2007    (JP) ................... 2007-208090

(51) Int. Cl.
*G10L 19/00*    (2006.01)
(52) U.S. Cl. ................ 704/216; 704/217; 704/218
(58) Field of Classification Search .............. 704/238, 704/200, 205, 206, 216, 217, 218, 231, 203, 704/237, 243; 367/125
See application file for complete search history.

(56) References Cited

U.S. PATENT DOCUMENTS 7,031,917 B2 *  4/2006  Asano .......................... 704/238
7,221,622 B2 *  5/2007  Matsuo et al. ................ 367/125

OTHER PUBLICATIONS

Furui, et al., "*Speech Information Processing*", Morikita Publishing Co., Ltd., 1998.
H.K. Dunn, et al., "*Exploration of Pressure Field Around the Human Head During Speech*", Bell Telephone Laboratories, New York, NY, vol. 10, pp. 184-199, Jan. 1939.

* cited by examiner

*Primary Examiner* — Huyen X. Vo
(74) *Attorney, Agent, or Firm* — Ohlandt, Greeley, Ruggiero, Perle, L.L.P.

(57) ABSTRACT

A speech processing apparatus includes a plurality of microphones which receive speech produced by a first sound source to obtain first speech signals for a plurality of channels having one-to-one correspondence with the plurality of microphones, a calculation unit configured to calculate a first characteristic amount indicative of an inter-channel correlation of the first speech signals, a storage unit configured to store in advance a second characteristic amount indicative of an inter-channel correlation of second speech signals for the plurality of channels obtained by receiving speech produced by a second sound source by the plurality of microphones, and a collation unit configured to collate the first characteristic amount with the second characteristic amount to determine whether the first sound source matches with the second sound source.

21 Claims, 7 Drawing Sheets

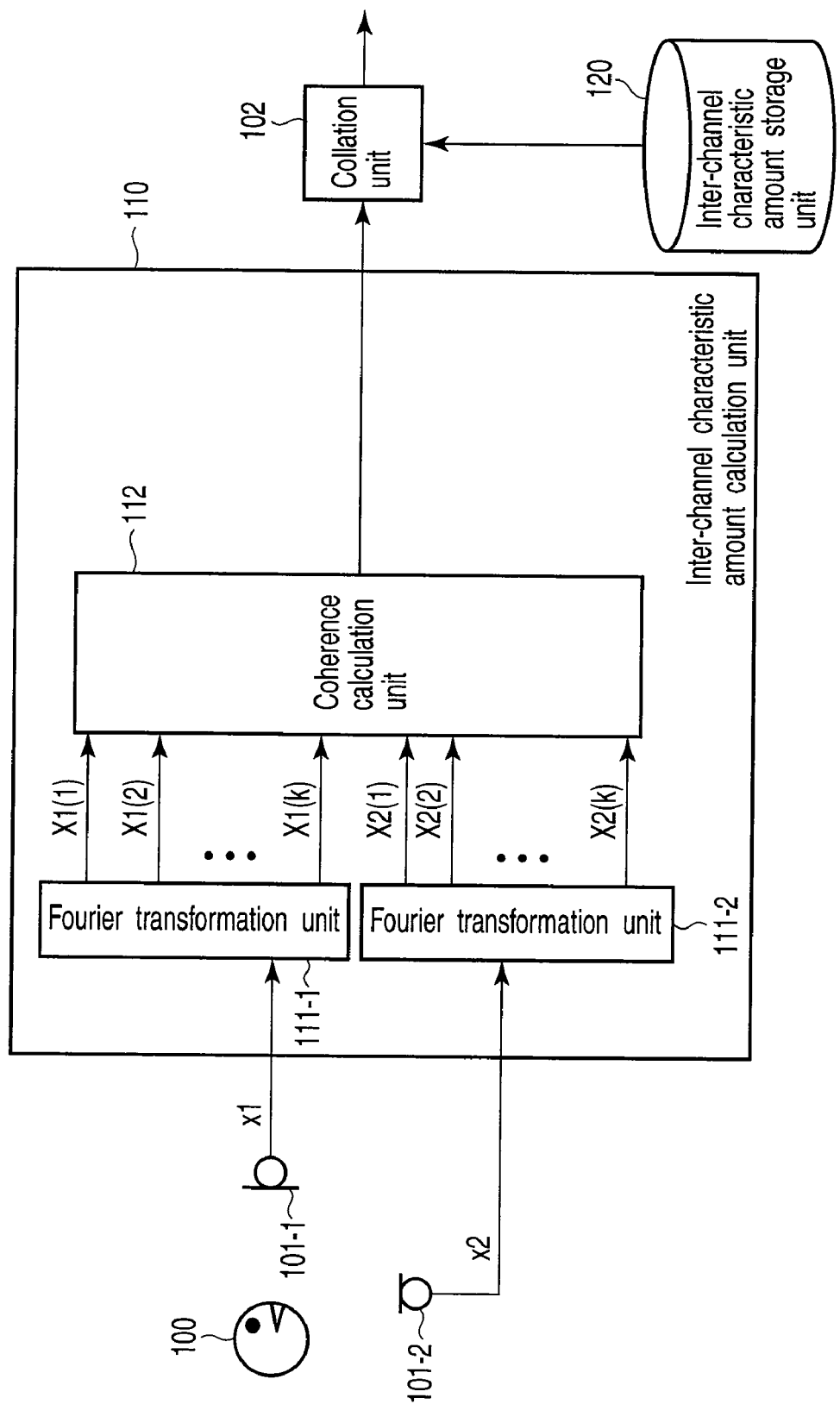
F I G. 1

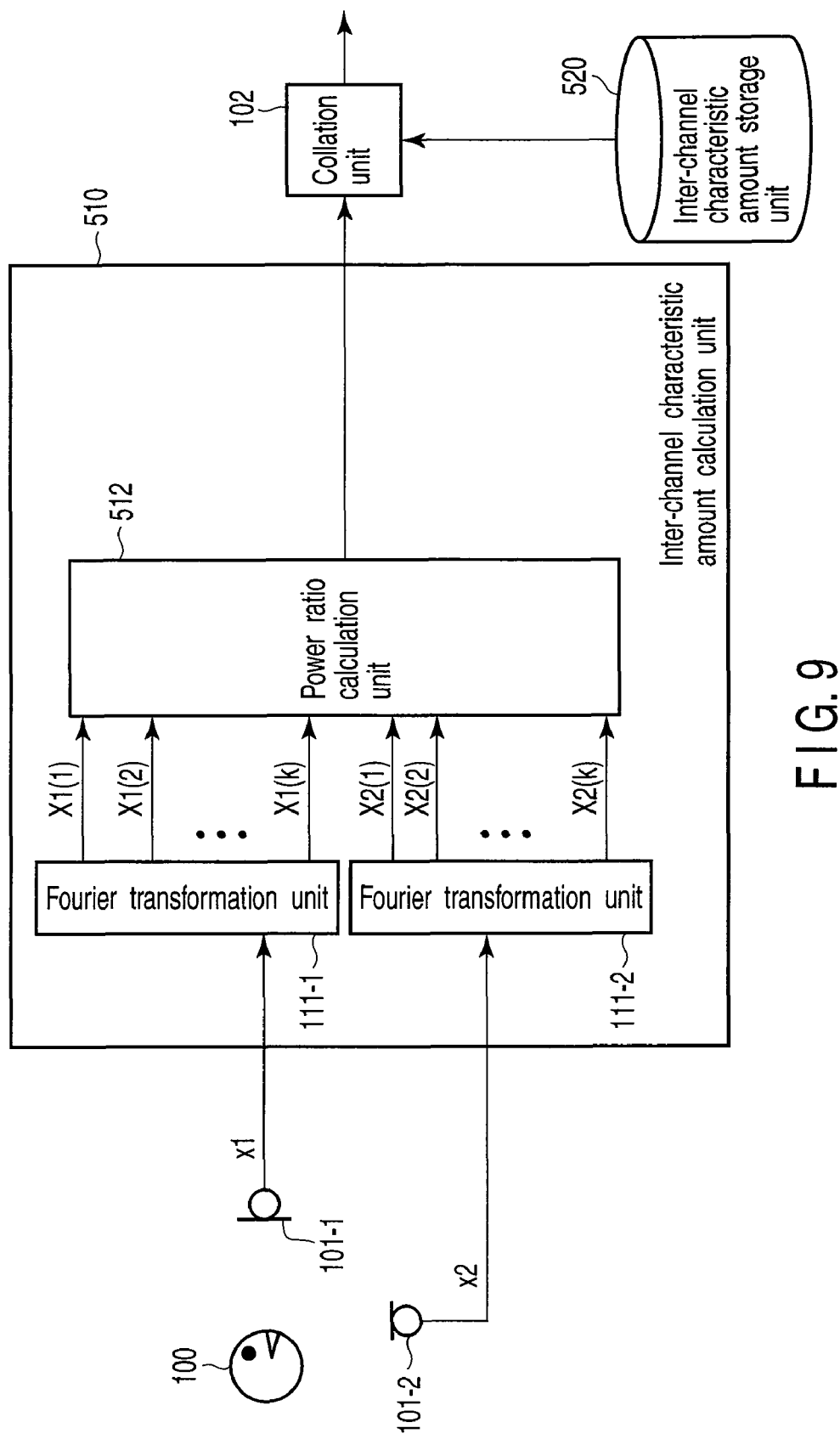
F I G. 9

SPEECH PROCESSING APPARATUS AND METHOD

CROSS-REFERENCE TO RELATED APPLICATIONS

This application is based upon and claims the benefit of priority from prior Japanese Patent Application No. 2007-208090, filed Aug. 9, 2007, the entire contents of which are incorporated herein by reference.

BACKGROUND OF THE INVENTION

1. Field of the Invention

The present invention relates to a speech processing apparatus and method that perform sound source recognition, speaker recognition, or speech recognition from input speech.

2. Description of the Related Art

As one of individual authentication technologies, a speaker recognition technology that recognizes a speaker from a characteristic amount of input speech is known. In "Furui et al., "Speech information Processing", Morikita Publishing Co., Ltd., 1998", the speaker recognition technology is classified into three types, i.e., a text-dependent type, a text-independent type, and text-specified type.

In a text-dependent type speaker recognition system, a speaker is recognized based on a comparison between a characteristic amount of speech by the speaker (a user) as a recognition target with respect to a specific text and characteristic amounts of speech by many speakers with respect to the same text prepared by the system in advance.

In a text-independent type speaker recognition system, a text spoken by a user is free. That is, the system recognizes a speaker by collating a characteristic amount obtained by normalizing speech from a user with characteristic amounts of previously recorded speech from a plurality of speakers. Therefore, it is known that accurate recognition is difficult as compared with the text-dependent type speaker recognition.

In a text-specified type speaker recognition system, a text that requests a user to speak is specified from the system side. The user actually speaks the specified text, and the system recognizes the speaker based on a comparison between a characteristic amount of this speech from the user and previously recorded characteristic amounts.

In the text-dependent type and text-independent type systems, when, e.g., a loudspeaker is used to reproduce recorded speech of the other person, a deception may be possibly carried out based on "impersonation" that taking on the position of an identical person is tried. On the other hand, in the text-specified speaker recognition system, since a text is specified at the time of authentication, it is considered that robustness with respect to "impersonation" is high as compared with the text-dependent type and text-independent type speaker recognition systems. However, in view of advancement of a digital signal processing technology in recent years, it is necessary to assume a situation where a specified text is produced on site by using speech synthesis technology to synthesize recorded speech of other persons. Further, the text-dependent type and text-independent type speaker recognition systems have a problem that usability is poor since a user must not misread a text.

Furthermore, although a technique of identifying a sound source by comparing spectral shapes of input speech or aged changes of the spectral shapes is also known, this technique can identify apparently different sound sources, e.g., a dog and a person but is hard to recognize actual speech and recorded speech.

Moreover, in not only speaker recognition but also speech recognition, an environmental sound (a sound output from a loudspeaker of, e.g., a television or a radio) around a user may be mixed in input speech, thereby possibly resulting in induction of erroneous recognition.

BRIEF SUMMARY OF THE INVENTION

According to an aspect of the invention, there is provided a speech processing apparatus comprising: a plurality of microphones which receive speech produced by a first sound source to obtain first speech signals for a plurality of channels having one-to-one correspondence with the plurality of microphones; a calculation unit configured to calculate a first characteristic amount indicative of an inter-channel correlation of the first speech signals; a storage unit configured to store in advance a second characteristic amount indicative of an inter-channel correlation of second speech signals for the plurality of channels obtained by receiving speech produced by a second sound source by the plurality of microphones; and a collation unit configured to collate the first characteristic amount with the second characteristic amount to determine whether the first sound source matches with the second sound source.

According to another aspect of the invention, there is provided a speech processing apparatus comprising: a plurality of microphones which receive speech produced by a sound source to obtain first speech signals for a plurality of channels having one-to-one correspondence with the plurality of microphones; a first calculation unit configured to calculate a first characteristic amount indicative of an inter-channel correlation of the first speech signals; a first storage unit configured to store in advance a second characteristic amount indicative of an inter-channel correlation between of second speech signals for the plurality of channels obtained by receiving speech produced by a human phonic organ by the plurality of microphones; a first collation unit configured to collate the first characteristic amount with the second characteristic amount and determine whether the sound source matches with the human phonic organ; a second calculation unit configured to calculate a first speaker characteristic amount indicative of characteristics of the speech from the sound source; a second storage unit configured to store in advance a second speaker characteristic amount indicative of characteristics of speech produced by a specific speaker; a second collation unit configured to collate the first speaker characteristic amount with the second speaker characteristic amount and determine whether the speech from the sound source matches with the speech produced by the specific speaker; and a determination unit configured to determine whether the sound source is a phonic organ of the specific speaker based on a collation result obtained by the first collation unit and a collation result obtained by the second collation unit.

According to another aspect of the invention, there is provided a speech processing apparatus comprising: a plurality of microphones which receive speech produced by a sound source to obtain first speech signals for a plurality of channels having one-to-one correspondence with the plurality of microphones; a first calculation unit configured to calculate a first characteristic amount indicative of an inter-channel correlation of the first speech signals a first storage unit configured to store in advance a second characteristic amount indicative of an inter-channel correlation of second speech signals for the plurality of channels obtained by receiving speech produced by a human phonic organ by the plurality of microphones; a first collation unit configured to collate the first characteristic amount with the second characteristic amount and determine whether the sound source matches with the human phonic organ; a second calculation unit configured to calculate a first speech characteristic amount of the speech from the sound source; a second storage unit configured to store in advance second speech characteristic amounts of a plurality of word strings; and a second collation unit configured to collate the first speech characteristic amount with the second speech characteristic amounts and output a word string that is closest to the speech from the sound source when the first collation unit determines that the sound source matches with the human phonic organ.

BRIEF DESCRIPTION OF THE SEVERAL VIEWS OF THE DRAWING

FIG. 1 is a block diagram showing a speech processing apparatus according to a first embodiment;

FIG. 9 is a block diagram showing a speech processing apparatus according to a fourth embodiment.

DETAILED DESCRIPTION OF THE INVENTION

Figure 2A:
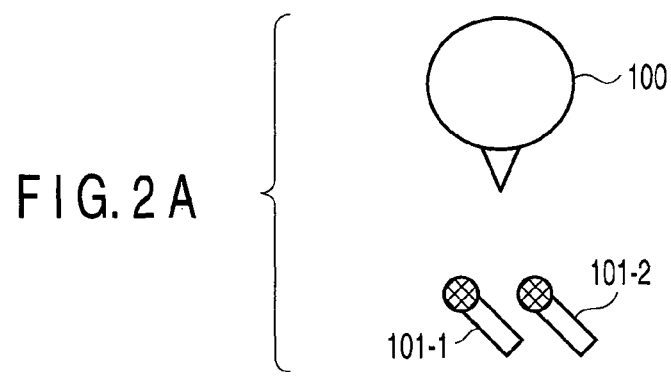
FIG. 2A is a top view showing a first arrangement example of microphones depicted in FIG. 1.

Embodiments according to the present invention will now be explained hereinafter with reference to the accompanying drawings.

First Embodiment

As shown in FIG. 1, a speech processing apparatus according to a first embodiment of the present invention has n (n is an integer greater than or equal to 2) microphones 101-1 to 101-n, an inter-channel characteristic amount calculation unit 110, a collation unit 102, and an inter-channel characteristic amount storage unit 120. The inter-channel characteristic amount calculation unit 110 includes n Fourier transformation units 111-1 to 111-n and a coherence calculation unit 112. Although a description will be given on the assumption that n=2 is achieved, the present invention is not restricted thereto.

The microphones 101-1 and 101-2 receive speech produced by a sound source 100 and output speech signals X1 and X2 for channels associated with the respective microphones. The speech signals X1 and X2 are input to the Fourier transformation units 111-1 and 111-2, respectively. The microphones 101-1 and 101-2 can be arranged in many ways.

Figure 2B:
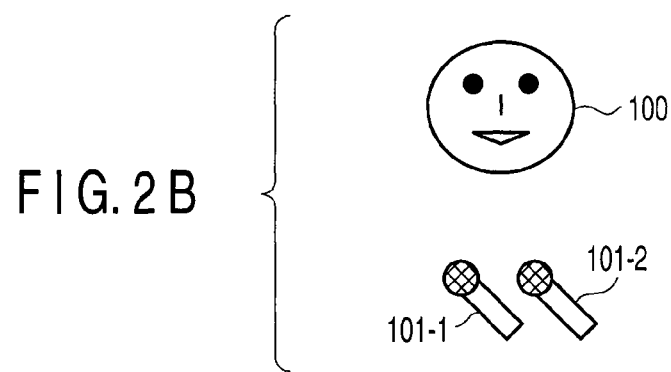
FIG. 2B is a front view showing the first arrangement example of the microphones depicted in FIG. 1.

For example, as shown in FIGS. 2A and 2B, the microphone 101-1 and the microphone 101-2 are arranged in close proximity to each other. In this case, when a distance between the microphone 101-1 and the microphone 101-2 is too short, the speech signals X1 and X2 are too similar to each other, and hence a correlation between the channels cannot be appropriately estimated. Therefore, assuring a gap between the microphones 101-1 and 101-2 that is substantially close to at least the lips of a person is desirable.

Figure 3A:
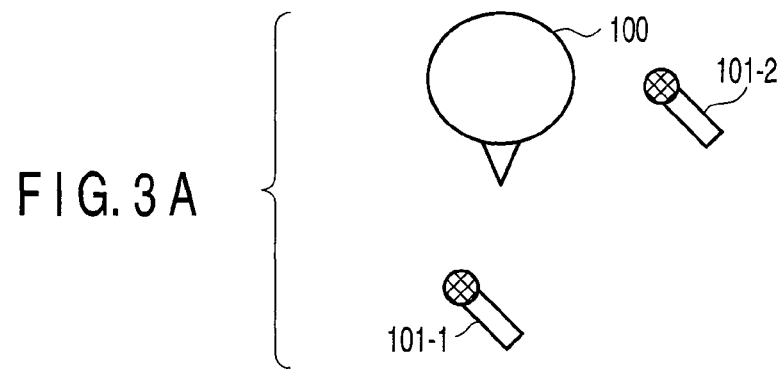
FIG. 3A is a top view showing a second arrangement example of the microphones depicted in FIG. 1.
Figure 3B:
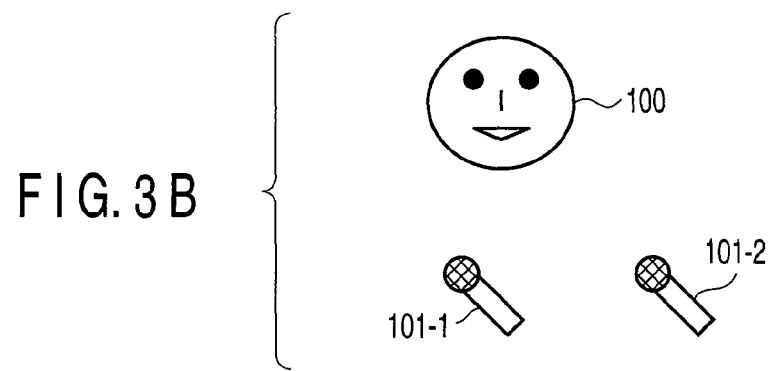
FIG. 3B is a front view showing the second arrangement example of the microphones depicted in FIG. 1.

In an example depicted in FIGS. 3A and 3B, the microphone 101-1 is arranged in front of the sound source 100, and the microphone 101-2 is arranged on a side of the sound source 100. When the microphone 101-1 and the microphone 101-2 are arranged in different directions from the sound source 100 in this manner, a change in emission characteristics of the sound source 100 can be easily reflected in a later-explained inter-channel characteristic amount, thus effectively identifying the sound source.

Figure 4A:
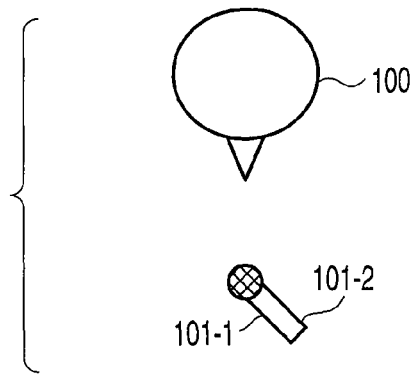
FIG. 4A is a top view showing a third arrangement example of the microphones depicted in FIG. 1.
Figure 4B:
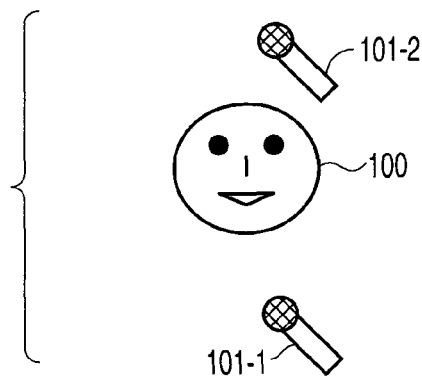
FIG. 4B is a front view showing the third arrangement example of the microphones depicted in FIG. 1.

Furthermore, when the microphones 101-1 and 101-2 are arranged in such a manner that a vertical distance between the microphone 101-1 and the sound source 100 becomes different from a vertical distance between the microphone 101-2 and the sound source 100, a change in emission characteristics of the sound source 100 can be likewise readily reflected in the later-explained inter-channel characteristic amount, thereby effectively identifying the sound source. For example, as shown in FIGS. 4A and 4B, the microphone 101-1 is arranged above the sound source 100, and the microphone 101-2 is arranged below the sound source 100. When the sound source 100 is a human phonic organ, sounds are emitted from not only the mouth but also other regions, e.g., the nose or the throat. Therefore, when the microphone 101-1 is arranged near the nose and the microphone 101-2 is arranged near the mouth, a difference between emission characteristics of the nose and the mouth is apt to be reflected in the later-explained inter-channel characteristic amount, thereby effectively identifying the sound source. For example, a voice produced when the mouth is closed and a voice produced when the mouth is opened have greatly different emission characteristics.

Figure 5A:
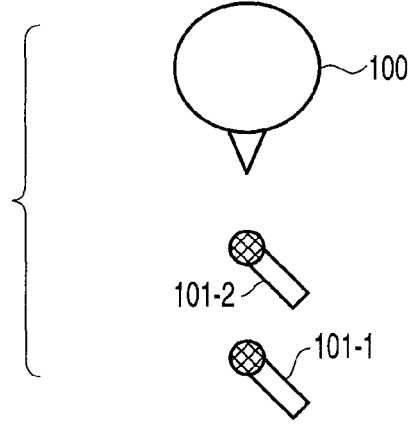
FIG. 5A is a top view showing a fourth arrangement example of the microphones depicted in FIG. 1.
Figure 5B:
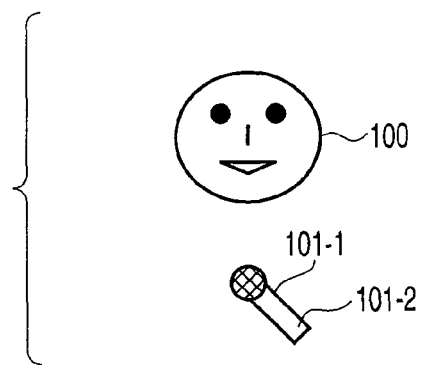
FIG. 5B is a front view showing the fourth arrangement example of the microphones depicted in FIG. 1.

In an example depicted in FIGS. 5A and 5B, the microphone 101-1 and the microphone 101-2 are arranged on a straight line from the sound source 100. When the microphones 101-1 and 101-2 are arranged in such a manner that a horizontal distance between the sound source 100 and the microphone 101-1 becomes different from a horizontal distance between the sound source 100 and the microphone 101-2 and they are arranged on a straight line, an installation space can be saved.

The Fourier transformation units 111-1 and 111-2 subject the input speech signals X1 and X2 to Fourier transformation and output Fourier transformed signals X1(1), . . . , X1(k) and X2(1), . . . , X2(k). Here, k denotes a frequency component number. For example, each of the Fourier transformation units 111-1 and 111-2 repeats processing of cutting out the speech signal X1 or X2 by using a window having a length L, then performing Fourier transformation, and shifting the obtained signal for a length M. Here, a signal unit to be cut out is called a frame. The Fourier transformed signals X1(1), . . . , X1(k) from the Fourier transformation unit 111-1 and the Fourier transformed signals X2(1), . . . , X2(k) from the Fourier transformation unit 111-2 are input to the coherence calculation unit 112.

The coherence calculation unit 112 calculates coherences by using the Fourier transformed signals X1(1), ..., X1(k) and the Fourier transformed signals X2(1), ..., X2(k). Here, the coherence is often used as an index indicative of a relationship (a correlation) between signals, and the following complex coherence is known.

$$\gamma(k) = \frac{E\{X_1^*(k)X_2(k)\}}{\sqrt{E\{|X_1(k)|^2\}E\{|X_2(k)|^2\}}} \quad (1)$$

wherein k represents a frequency number; γ(k), a kth complex coherence value; E(X), an expected value of X; and *, a complex conjugate.

Usually, E(X) represents an expected value of X in a time direction, and it is often derived by using an average value of X in a calculated frame. Moreover, an amplitude square coherence obtained by raising an absolute value of γ(k) in Expression (1) to the second power as follows is also known.

$$|\gamma(k)|^2 = \frac{|E\{X_1^*(k)X_2(k)\}|^2}{E\{|X_1(k)|^2\}E\{|X_2(k)|^2\}} \quad (2)$$

Each coherence calculated by the coherence calculation unit 112 may be either a complex coherence represented by Expression (1) or an amplitude square coherence represented by Expression (2). For example, since the complex coherence represented by Expression (1) is a complex number, a value in which a phase difference between the input signals X1 and X(2) is reflected can be obtained. Since the amplitude square coherence represented by Expression (2) is a positive number, various kinds of processing including a comparison can be easily performed.

Here, a technical significance of using the coherence as the inter-channel characteristic amount will now be explained. For example, as shown in "Exploration of Pressure Field Around the Human Head During Speech" H. K. Dunn and D. W. Farnsworth, Bell Telephone Laboratories, New York, N.Y., January 1939, it is known that emission characteristics of speech produced by a person differ depending on each direction in the technical field of speech signal processing. It is considered that the emission characteristics also differ depending on each uttered phoneme, sounds are emitted from not only a mouth but also respective phonic organs, e.g., the nose or the throat, and emission characteristics vary every second based on superimposition of these sounds. Therefore, in calculation of the coherence γ, assuming that a time length required to obtain the expected value E(X) is sufficiently long, e.g., approximately word length, a correlation between the speech signals X1 and X2 becomes small, and the coherence y also becomes a small value. On the other hand, since a loudspeaker has predetermined emission characteristics that are not dependent on phonemes, even when reproducing recorded human speech, the coherence y takes a value close to a maximum value 1.

As explained above, the coherence γ differs depending on a case where the same word is spoken from a phonic organ of a person and a case where this speech is recorded and reproduced by the loudspeaker. In this embodiment, an attention is paid to this difference of the coherence γ, and which one of the loudspeaker and the human phonic organ is the sound source is identified.

Incidentally, paying attention to a difference in emission characteristics between a person's actual speech and recorded speech, a technique that determines as a characteristic amount a vector having a plurality of powers obtained by providing a plurality of microphones around the sound source as elements can be also considered. However, according to this technique, a combination of small loudspeakers is used to imitate average emission characteristics of a person, and "impersonation" may become possible. Therefore, the accuracy of sound source identification becomes low as compared with this embodiment.

The coherence calculation unit 112 calculates an inter-channel characteristic amount f based on the calculated coherences γ(1), ..., γ(k) and transfers it to the collation unit 102. Here, as the inter-channel characteristic amount f, a vector having the coherences γ(1), ..., γ(k) calculated by the coherence calculation unit 112 as k components without change is used, for example. Further, all the k coherences do not have to be the components of the inter-channel characteristic amount f, and they may be averaged in a frequency direction to compress a dimension. For example, it is possible to use a vector obtained by averaging the coherences at all frequencies to realize compression to one dimension. Alternatively, the coherences may be averaged in units of sub-band to compress a dimension. Besides, the dimension can be effectively compressed by using a dimension compressing technology, e.g., a reduction in the number of dimensions based on main component analysis or linear discriminant analysis. Compressing the dimension enables reducing a processing burden on the later-explained collation unit 102. Furthermore, thinning-out processing of selecting a main frequency band alone of speech may be performed. Moreover, respective components may be weighted, or respective components may be subjected to linear transformation. Additionally, when the input speech has a relatively long time length corresponding to, e.g., continuous words, a plurality of time lengths required to calculate the coherences may be provided. That is, a time-series data of the plurality of calculated coherences may be determined as the inter-channel characteristic amount f.

In an actual environment, each coherence γ calculated by the coherence calculation unit 112 is greatly affected by not only speech directly received from the sound source 100 but also reflection or reverberation at a specific frequency, and a deviation from an original coherence may occur. For example, a value of the coherence γ may be reduced like a dip shape at a specific frequency. A value of the inter-channel characteristic amount f may vary due to such a deviation of the coherence γ, which results in a factor that degrades a collation accuracy of the collation unit 102. Further, the deviation is greatly affected when a position of the sound source 100 is just slightly changed, and it is difficult to avoid this deviation before happens. Therefore, smoothing the coherence γ in a frequency direction afterwards to reduce the deviation is effective. To smooth the coherence γ in the frequency direction, the coherence calculation unit 112 calculates a moving average or utilizes a median filter, for example.

The inter-channel characteristic amount storage unit 120 stores in advance an inter-channel characteristic amount fA concerning a specific sound source A in association with the specific sound source A. Incidentally, it is assumed that a format (e.g., a dimension) of the inter-channel characteristic amount fA matches with the inter-channel characteristic amount f calculated by the coherence calculation unit 112.

The collation unit 102 collates the inter-channel characteristic amount f concerning the sound source 100 transferred from the coherence calculation unit 112 with the inter-channel characteristic amount fA concerning the specific sound source A read out from the inter-channel characteristic amount storage unit 120 to determine whether the sound source 100 matches with the specific sound source A. Specifically, the collation unit 102 compares a Euclidean distance between the inter-channel characteristic amount f and the inter-channel characteristic amount fA with a preset threshold value to determine whether the sound source 100 matches with the specific sound source A, for example. Furthermore, the collation unit 102 may compare likelihood of a probability model using the inter-channel characteristic amount f and the inter-channel characteristic amount fA as parameters with a preset threshold value to determine whether the sound source 100 matches with the specific sound source A, for example. Besides, various techniques in, e.g., a pattern matching technology can be applied.

Moreover, the inter-channel characteristic amount storage unit 120 may further store an inter-channel characteristic amount fB concerning a specific sound source B different from the specific sound source A. In this example, the threshold value does not have to be provided, and the collation unit 102 may compare a Euclidean distance dA between the inter-channel characteristic amount f and the inter-channel characteristic amount fA with a Euclidean distance dB between the inter-channel characteristic amount f and the inter-channel characteristic amount fB to determine whether the sound source 100 matches with the specific sound source A. That is, when the Euclidean distance dA is smaller than the Euclidean distance dB, the collation unit 102 can determine that the sound source 100 matches with the specific sound A. Additionally, likelihood LA of a probability model using the inter-channel characteristic amount f and the inter-channel characteristic amount fA as parameters may be compared with likelihood LB of the probability model using the inter-channel characteristic amount f and the inter-channel characteristic amount fB as parameters to determine whether the sound source 100 matches with the specific sound source A. Further, as explained above, in regard to the inter-channel characteristic amount using the loudspeaker as the sound source, the coherence takes a value substantially close to 1 at all frequencies. Therefore, the inter-channel characteristic amount storage unit 120 does not have to be provided, and whether the sound source 100 is the loudspeaker may be determined based on how much each coherence $\gamma$ calculated in relation to the sound source 100 is smaller than 1.

Furthermore, when the specific sound source A is a human phonic organ, each coherence $\gamma$ differs depending on the contents of speech even though the speaker is the same. Therefore, coherences calculated from a plurality of speech samples obtained from the specific sound source A are stored in the inter-channel characteristic amount storage unit 120 as the inter-channel characteristic amounts fA, and it can be determined that the sound source 100 matches with the specific sound source A when one of these coherences is close to the inter-channel characteristic amount f, thereby improving a collation accuracy of the collation unit 102. Moreover, an average value of the coherences obtained from the plurality of speech samples may be stored in the inter-channel characteristic amount storage unit 120 as a representative value of the inter-channel characteristic amounts fA concerning the specific sound source A.

Figure 6:
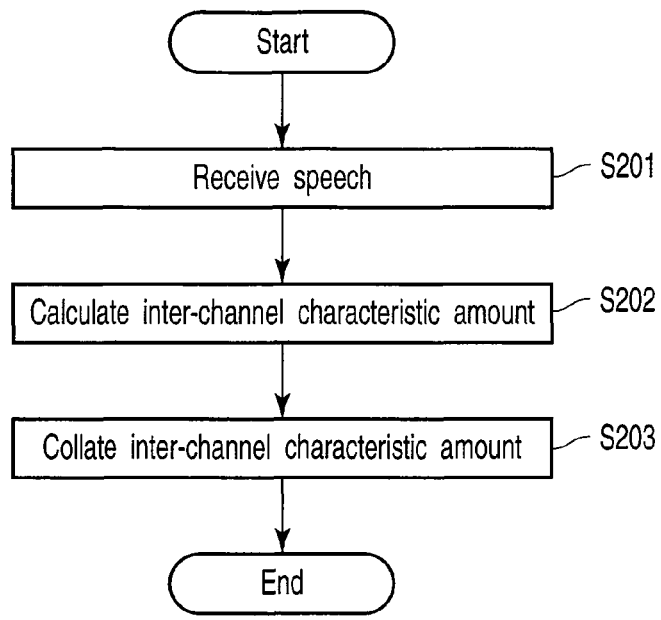
FIG. 6 is a flowchart showing an operation of the speech processing apparatus depicted in FIG. 1.

An operation of the speech processing apparatus according to this embodiment will now be explained with reference to a flowchart depicted in FIG. 6.

First, the microphones 101-1 and 101-2 receive speech signals produced by the sound source 100 and transfer them as the input signals X1 and X2 to the Fourier transformation units 111-1 and 111-2, respectively (step S201).

Then, the inter-channel characteristic amount calculation unit 110 calculates the inter-channel characteristic amount f from the input signals X1 and X2 received at step S201 (step S202). That is, each of the Fourier transformation units 111-1 and 111-2 transforms the input signal X1 or X2 received at step S201 into Fourier transformed signals X1(1), . . . , X1(k) including k frequency components or Fourier transformed signals X2(1), . . . , X2(k) including the same and transfers them to the coherence calculation unit 112. Subsequently, the coherence calculation unit 112 calculates the inter-channel characteristic amount f based on k coherences $\gamma(1), \ldots, \gamma(k)$ respectively calculated from the Fourier transformed signals X1(1), . . . , X1(k) and X2(1), . . . , X2(k) and transfers it to the collation unit 102.

Then, the collation unit 102 collates the inter-channel characteristic amount f calculated at step S202 with the inter-channel characteristic amount fA concerning the specific sound source A read out from the inter-channel characteristic amount storage unit 120 (step S203). The collation unit 102 outputs a determination result indicating whether the sound source 100 matches with the specific sound source A based on a degree that the inter-channel characteristic amount f coincides with the inter-channel characteristic amount f (e.g., the above-explained Euclidean distance between the characteristic amounts).

As explained above, the speech processing apparatus according to this embodiment stores in advance the inter-channel characteristic amount concerning the specific sound source in advance and collates this characteristic amount with the inter-channel characteristic amount concerning the sound source as a recognition target to thereby determine whether the sound source as the recognition target coincides with the specific sound source. Therefore, according to this embodiment, the speech processing apparatus that accurately recognize a sound source from input speech can be provided. For example, when the specific sound source is a human phonic organ, whether the sound source as the recognition target is the human phonic organ can be determined. Further, when the specific sound source is a loudspeaker from which recorded human speech is produced, whether the sound source as the recognition target is the loudspeaker can be determined. Furthermore, when the specific sound source is a plurality of human phonic organs, a speaker can be recognized.

Second Embodiment

Figure 7:
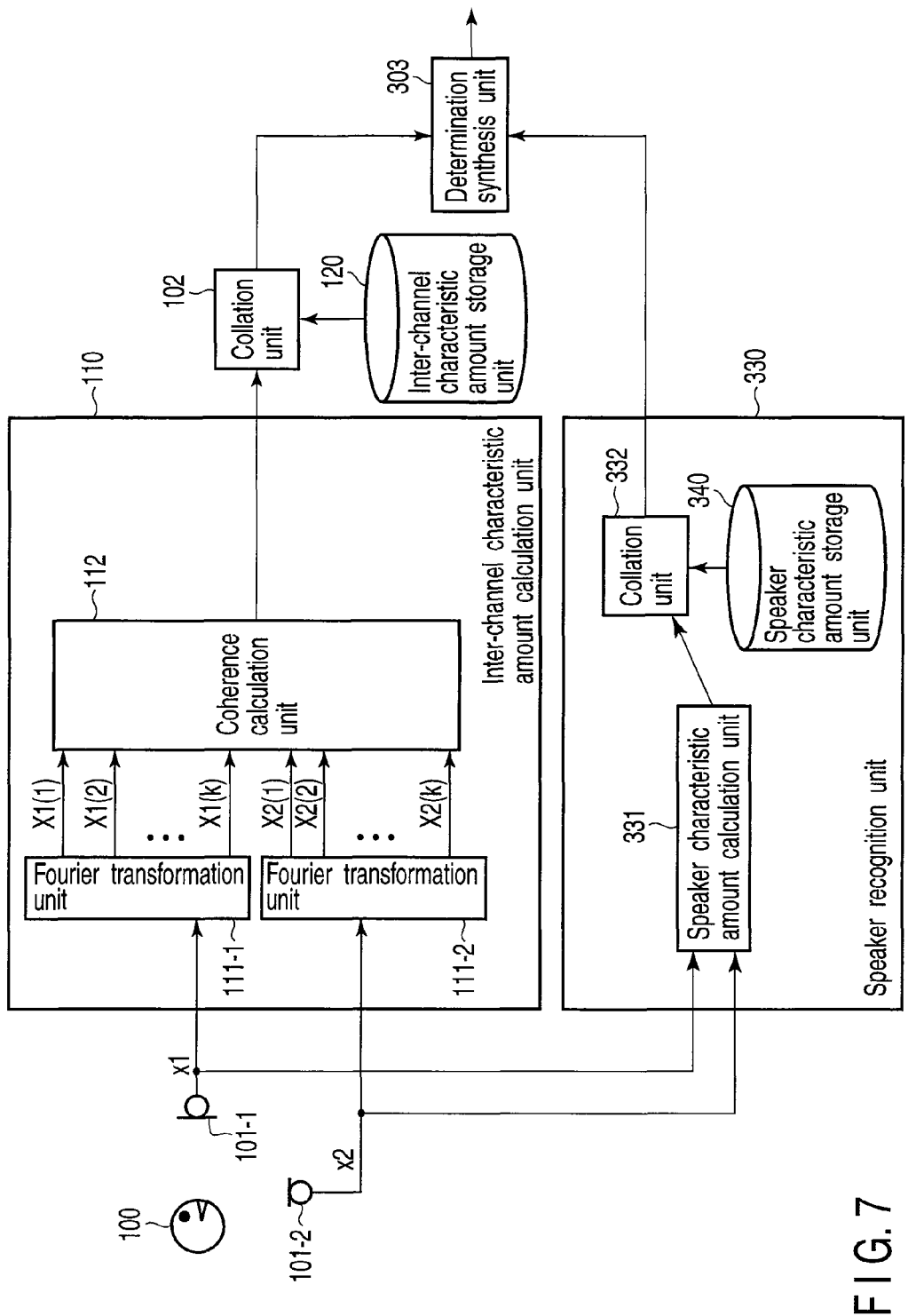
FIG. 7 is a block diagram showing a speech processing apparatus according to a second embodiment.

As shown in FIG. 7, in a speech processing apparatus according to a second embodiment of the present invention, a determination synthesis unit 303 and a speaker recognition unit 330 are provided in addition to the speech processing apparatus depicted in FIG. 1. In the following description, like reference numbers in FIG. 7 denote parts equal to those in FIG. 1 to omit a detailed explanation thereof, and parts different from FIG. 1 will be mainly explained.

The determination synthesis unit 303 receives from a collation unit 102 a collation result indicating whether a sound source 100 is a human phonic organ and receives from the speaker recognition unit 330 a collation result indicating a speaker who is closest to the sound source 100. The determination synthesis unit 303 synthesizes these collation results and outputs a determination result indicating whether the sound source 100 is a phonic organ of a specific speaker. Specifically, the determination synthesis unit 303 outputs a determination result indicating a coincidence with a phonic organ of a specific speaker specified by a collation result from the speaker recognition unit 303 only when a collation result indicating that the sound source 100 is a human phonic organ is obtained from the collation unit 102, for example. It is to be noted that the operation of the determination synthesis unit 303 is not restricted to that explained above. For example, if the collation result from the collation unit 102 and the collation result from the speaker recognition unit 330 can be obtained by scores, values of both the scores or function values using the scores as parameters may be compared with a preset threshold value to make a determination.

The speaker recognition unit 330 has a speaker characteristic amount calculation unit 331, a collation unit 332, and a speaker characteristic amount storage unit 340. The speaker recognition unit 330 outputs a recognition result indicative of a speaker who is closest to the sound source 100 from input speech X1 and X2 from microphones 101-1 and 101-2.

The speaker characteristic amount calculation unit 331 calculates a speaker characteristic amount based on the input speech X1 and X2 from the microphones 101-1 and 101-2 and transfers it to the collation unit 332. The collation unit 332 collates the speaker characteristic amount transferred from the speaker characteristic amount calculation unit 331 with a speaker characteristic amount stored in the speaker characteristic amount storage unit 340, and informs the determination synthesis unit 303 of a collation result indicative of a speaker who is closest to the sound source 100. The speaker characteristic amount storage unit 340 stores speaker characteristic amounts concerning a plurality of preset speakers acquired from the speaker characteristic amount calculation unit 331 in association with the speakers, respectively.

The speech processing apparatus according to this embodiment combines sound source identification in the first embodiment with general speaker recognition. Therefore, according to this embodiment, it is possible to provide the speech processing apparatus that accurately performs speaker recognition from a characteristic amount of input speech while avoiding "impersonation".

Third Embodiment

Figure 8:
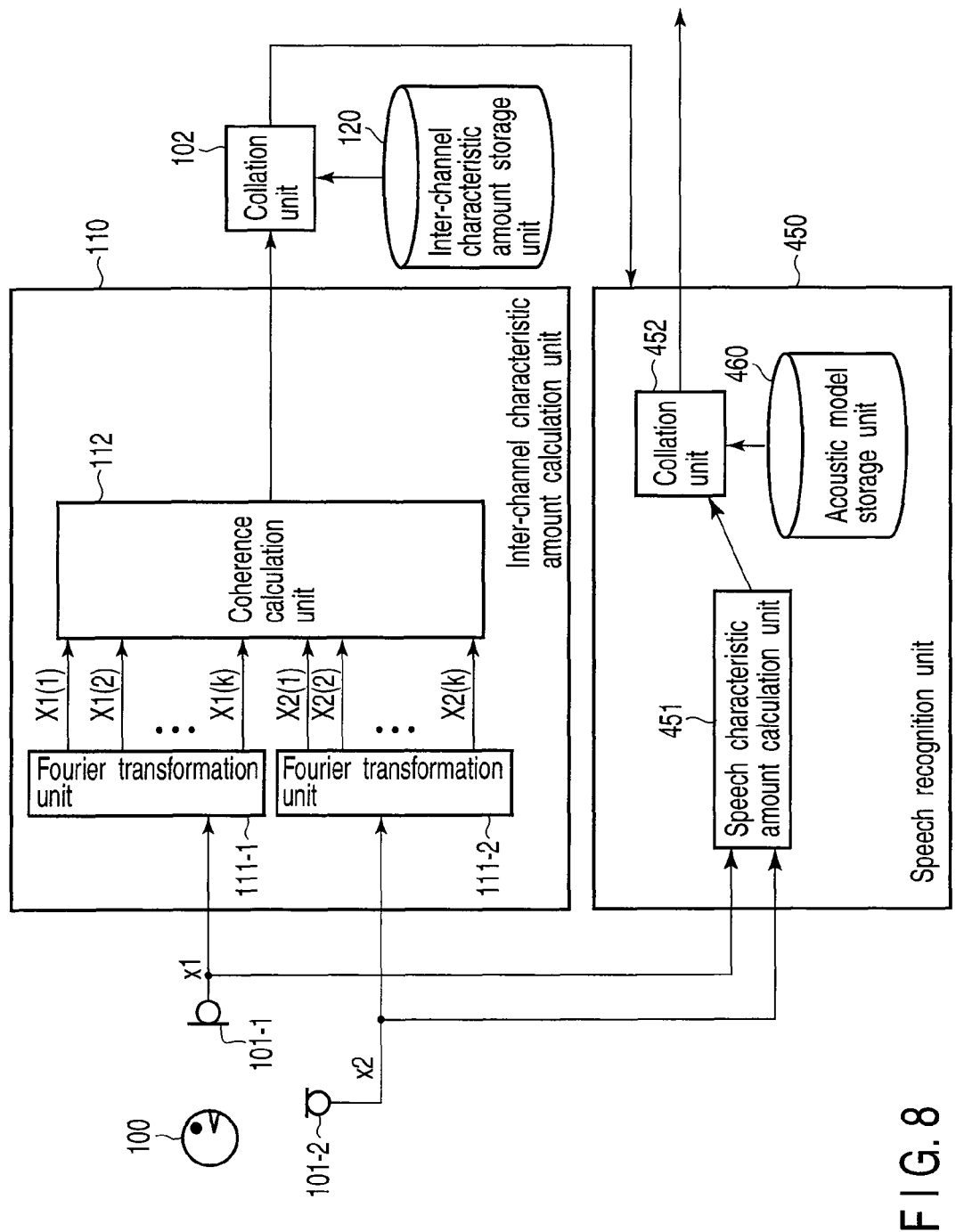
FIG. 8 is a block diagram showing a speech processing apparatus according to a third embodiment.

As shown in FIG. 8, in a speech processing apparatus according to a third embodiment of the present invention is further provided a speech recognition unit 450 in addition to the speech processing apparatus depicted in FIG. 1. In the following description, like reference numbers in FIG. 8 denote parts equal to those in FIG. 1 to omit a detailed explanation thereof, and parts different from FIG. 1 will be mainly explained.

The speech recognition unit 450 has a speech characteristic amount calculation unit 451, a collation unit 452, and an acoustic model storage unit 460. The speech recognition unit 450 outputs a word string that is closest to input speech X1 and X2 from microphones 101-1 and 101-2 only when a collation result indicating that a sound source 100 matches with a human phonic organ is accepted from a collation unit 102.

The speech characteristic amount calculation unit 451 calculates a speech characteristic amount based on the input speech X1 and X2 from the microphones 101-1 and 101-2, and transfers it to the collation unit 452. The collation unit 452 collates the speech characteristic amount transferred from the speech characteristic amount calculation unit 451 with an acoustic model stored in the acoustic model storage unit 460, and outputs a word string that is closest to the input speech based on an acoustic coincidence degree. The acoustic model storage unit 460 also stores speech characteristic amounts of a plurality of word strings. As a storage method, there is a method of storing word strings themselves, but storing in units of words or phonemes enables reducing storage requirements. In this case, words or phonemes are combined to produce a word string.

The speech processing apparatus according to this embodiment outputs a speech recognition result only when the sound source is identified as a human phonic organ. Therefore, according to this embodiment, it is possible to provide the speech processing apparatus that accurately performs speech recognition with a characteristic amount alone of input speech from a user being determined as a target even if an environmental sound, e.g., the sound of a television, is mixed in input speech from the user.

It is to be noted that the speech recognition unit performs speech recognition based on a degree of acoustic coincidence by using the acoustic model in this embodiment, but also utilizing a degree of linguistic coincidence calculated by using a language model is also effective when performing continuous speech recognition in particular.

Fourth Embodiment

As shown in FIG. 9, in a speech processing apparatus according to a fourth embodiment of the present invention, an inter-channel characteristic amount calculation unit 510 substitutes for the inter-channel characteristic amount calculation unit 110 depicted in FIG. 1, and an inter-channel characteristic amount storage unit 520 substitutes for the inter-channel characteristic amount storage unit 120 depicted in the same. In the following description, like reference numbers in FIG. 9 denote parts equal to those in FIG. 1 to omit a detailed explanation thereof, and parts different from FIG. 1 will be mainly explained. It is to be noted that the speech processing apparatus according to this embodiment is not restricted to those explained above, and the inter-channel characteristic amount calculation unit 510 may substitute for the inter-channel characteristic amount calculation unit 110 depicted in FIG. 7 or 8, and the inter-channel characteristic amount storage unit 520 may substitute for the inter-channel characteristic amount storage unit 120 depicted in the same, respectively.

In the inter-channel characteristic amount calculation unit 510, a power ratio calculation unit 512 substitutes for the coherence calculation unit 112 in the inter-channel characteristic amount calculation unit 110. The inter-channel characteristic amount calculation unit 510 calculates an inter-channel characteristic amount f from input speech X1 and X2 from microphones 101-1 and 101-2.

The power ratio calculation unit 512 calculates power ratios p(1), ..., p(k) from signals X1(1), ..., X1(k) from a Fourier transformation unit 111-1 and signals X2(1), ..., X2(k) from a Fourier transformation unit 111-2. Specifically, the power ratio calculation unit 512 uses the following Expression (3) to calculate the power ratios p.

$$p(k) = \frac{E\{|X_2(k)|^2\}}{E\{|X_1(k)|^2\}} \quad (3)$$

wherein k is a frequency component number, and p(k) is a kth power ratio.

The power ratio calculation unit 512 outputs as the inter-channel characteristic amount f a vector having k components, i.e., the power ratios p(1), ..., p(k) as elements. It is to be noted that the inter-channel characteristic amount f output from the power ratio calculation unit 512 is not restricted to that explained above. For example, aggregation in units of a plurality of sub-bands may be performed or aggregation to one component at all frequencies may be carried out to compress a dimension. Further, when speech time lengths of the input speech X1 and X2 are sufficiently long, time-series data formed by calculating the power ratios p at a plurality of positions on a time axis may be used as the inter-channel characteristic amount f. When using the time-series data as the inter-channel characteristic amount, using, e.g., a hidden Markov model (HMM) enables absorbing a fluctuation in a duration of each phoneme, thereby improving a quality of the inter-channel characteristic amount f.

The inter-channel characteristic amount storage unit 520 stores the inter-channel characteristic amount f concerning a preset sound source acquired from the inter-channel characteristic amount calculation unit 510 like the inter-channel characteristic amount storage unit 120.

The speech processing apparatus according to this embodiment uses the power ratios as the inter-channel characteristic amount, and the power ratios can substitute for the coherences in the speech processing apparatus according to each of the foregoing embodiment. Moreover, in the speech processing apparatus according to each of the foregoing embodiments, using both the power ratios and the coherences enables improving accuracies for sound source recognition, speaker recognition, and speech recognition. Therefore, according to this embodiment, it is possible to provide the speech processing apparatus that accurately performs sound source recognition, speaker recognition, and speech recognition from a characteristic amount of input speech.

Fifth Embodiment

Figure 10:
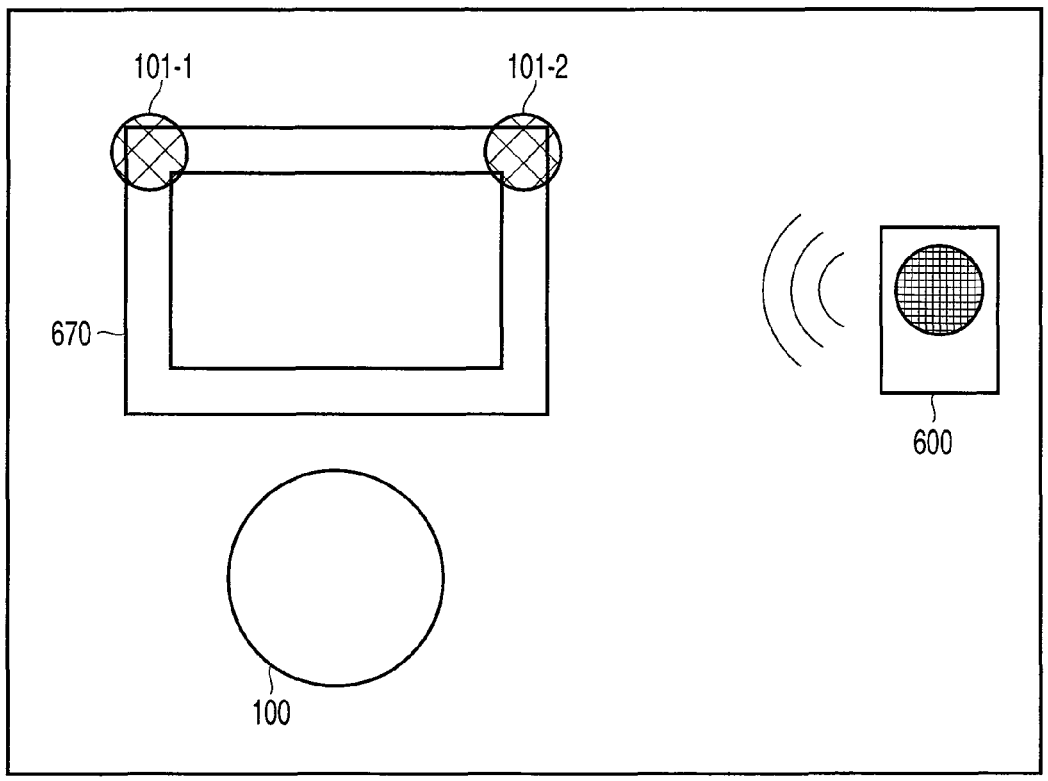
FIG. 10 is a view showing a speech processing system according to a fifth embodiment.

As shown in FIG. 10, in a speech processing system according to a fifth embodiment of the present invention, the speech processing apparatus according to any one of the foregoing embodiment is installed, this apparatus has a terminal 670 and microphones 101-1 and 101-2.

The microphones 101-1 and 101-2 receive speech produced by a sound source 100 and a sound source 600, and transfer them to a non-illustrated processing unit in the terminal 670. Here, the sound source 600 is a sound source aiming at "impersonation" that imitates the sound source 100. Constituent elements other than the microphones in the speech processing apparatus according to any one of the foregoing embodiments are installed in the terminal 670, and the terminal 670 performs predetermined processing with respect to the speech from the sound source 100 and the sound source 600 received by the microphones 101-1 and 101-2.

As explained above, according to this embodiment, the sound source aiming at "impersonation" can be recognized, thereby avoiding a malicious operation with respect to the system. That is, if a sound source as a recognition target is a sound source aiming at "impersonation", it is possible to take a countermeasure, e.g., avoidance of performance of subsequent processing by the system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech processing apparatus comprising:
   a plurality of microphones which receive speech produced by a first sound source to obtain first speech signals for a plurality of channels having one-to-one correspondence with the plurality of microphones, the first sound source being either a human phonic organ or a loudspeaker;
   a calculation unit configured to calculate a first characteristic amount indicative of an inter-channel correlation of the first speech signals;
   a storage unit configured to store in advance a second characteristic amount in association with information, the second characteristic amount being indicative of an inter-channel correlation of second speech signals for the plurality of channels obtained by receiving speech produced by a second sound source by the plurality of microphones, the second sound source being either a human phonic organ or a loudspeaker, the information indicating that the second sound source is either the human phonic organ or the loudspeaker; and
   a collation unit configured to collate the first characteristic amount with the second characteristic amount to determine that the first sound source matches with either a human phonic organ or a loudspeaker based on an inter-channel correlation of a speech produced by a loudspeaker being greater than an inter-channel human correlation of speech produced by a human phonic organ.

2. The apparatus according to claim 1, wherein the second sound source is a human phonic organ.

3. The apparatus according to claim 1, wherein the second sound source is a human phonic organ, the storage unit further stores a third characteristic amount indicative of an inter-channel correlation third speech signals for the plurality of channels obtained by receiving recorded speech reproduced by a loudspeaker by the plurality of microphones, and the collation unit further collates the first characteristic amount with the third characteristic amount, and determines that the first sound source matches with the second sound source when the first characteristic amount is close to the second characteristic amount rather than the third characteristic amount.

4. The apparatus according to claim 1, wherein the second sound source is a phonic organ of a specific speaker.

5. The apparatus according to claim 1, wherein the second sound source is a phonic organ of a specific speaker, the storage unit further stores a fourth characteristic amount indicative of an inter-channel correlation of fourth speech signals for the plurality of channels obtained by receiving speech produced by a phonic organ of a speaker different from the specific speaker by the plurality of microphones, and the collation unit further collates the first characteristic amount with the fourth characteristic amount, and determines that the first sound source matches with the second sound source when the first characteristic amount is close to the second characteristic amount rather than the fourth characteristic amount.

6. The apparatus according to claim 1, wherein each of the first characteristic amount and the second characteristic amount is a coherence between the plurality of channels.

7. The apparatus according to claim 1, wherein each of the first characteristic amount and the second characteristic amount is a linear transformation result of a coherence between the plurality of channels.

8. The apparatus according to claim 1, wherein each of the first characteristic amount and the second characteristic amount is a power ratio between the plurality of channels.

9. The apparatus according to claim 1, wherein the plurality of microphones include a first microphone and a second microphone that is arranged apart from the first microphone with a gap equal in size to or greater than a width of a person's lips.

10. The apparatus according to claim 1, wherein the plurality of microphones include a first microphone arranged at a position that is a first horizontal distance apart from the first sound source and the second sound source and a second microphone arranged at a position that is a second horizontal distance from the first sound source and the second sound source.

11. The apparatus according to claim 1, wherein the plurality of microphones include a first microphone arranged at a position that is a first vertical distance apart from the first sound source and the second sound source and a second microphone arranged at a position that is a second vertical distance apart from the first sound source and the second sound source.

12. The apparatus according to claim 1, wherein the plurality of microphones include a first microphone arranged in a first direction with respect to the first sound source and the second sound source and a second microphone arranged in a second direction with respect to the first sound source and the second sound source.

13. The apparatus according to claim 1, wherein the plurality of microphones include a first microphone arranged at a first height above the ground and a second microphone arranged at a second height above the ground.

14. The apparatus according to claim 13, wherein the first height above the ground is higher than positions of the first sound source and the second sound source, and the second height above the ground is lower than the positions of the first sound source and the second sound source.

15. A speech processing apparatus comprising:
a plurality of microphones which receive speech produced by a sound source to obtain first speech signals for a plurality of channels having one-to-one correspondence with the plurality of microphones;
a first calculation unit configured to calculate a first characteristic amount indicative of an inter-channel correlation of the first speech signals; a first storage unit configured to store in advance a second characteristic amount indicative of an inter-channel correlation between of second speech signals for the plurality of channels obtained by receiving speech produced by a human phonic organ by the plurality of microphones;
a first collation unit configured to collate the first characteristic amount with the second characteristic amount and determine whether the sound source matches with the human phonic organ;
a second calculation unit configured to calculate a first speaker characteristic amount indicative of characteristics of the speech from the sound source; a second storage unit configured to store in advance a second speaker characteristic amount indicative of characteristics of speech produced by a specific speaker;
a second collation unit configured to collate the first speaker characteristic amount with the second speaker characteristic amount and determine whether the speech from the sound source matches with the speech produced by the specific speaker; and
a determination unit configured to determine whether the sound source is a phonic organ of the specific speaker based on a collation result obtained by the first collation unit and a collation result obtained by the second collation unit.

16. A speech processing apparatus comprising:
a plurality of microphones which receive speech produced by a sound source to obtain first speech signals for a plurality of channels having one-to-one correspondence with the plurality of microphones;
a first calculation unit configured to calculate a first characteristic amount indicative of an inter-channel correlation of the first speech signals a first storage unit configured to store in advance a second characteristic amount indicative of an inter-channel correlation of second speech signals for the plurality of channels obtained by receiving speech produced by a human phonic organ by the plurality of microphones;
a first collation unit configured to collate the first characteristic amount with the second characteristic amount and determine whether the sound source matches with the human phonic organ;
a second calculation unit configured to calculate a first speech characteristic amount of the speech from the sound source;
a second storage unit configured to store in advance second speech characteristic amounts of a plurality of word strings; and
a second collation unit configured to collate the first speech characteristic amount with the second speech characteristic amounts and output a word string that is closest to the speech from the sound source when the first collation unit determines that the sound source matches with the human phonic organ.

17. A speech processing method comprising:
receiving, by a plurality of microphones, speech produced by a first sound source to obtain first speech signals for a plurality of channels by the plurality of microphones having one-to-one correspondence with the plurality of channels, the first sound source being either a human phonic organ or a loudspeaker;
calculating, by using a calculation unit, a first characteristic amount indicative of an inter-channel correlation of the first speech signals;
storing, by using a storage unit, in advance a second characteristic amount in association with information, the second characteristic amount being indicative of an inter-channel correlation of second speech signals for the plurality of channels obtained by receiving speech produced by a second sound source by the plurality of microphones, the second sound source being either a human phonic organ or a loudspeaker, the information indicating that the second sound source is either the human phonic organ or the loudspeaker; and
collating, by using a collation unit, the first characteristic amount with the second characteristic amount to determine that the first sound source matches with either a human phonic organ or a loudspeaker based on an inter-channel correlation of speech produced by a loudspeaker being greater than an inter-channel correlation of speech produced by a human phonic organ.

18. A computer readable non-transitory storage medium storing instructions of a computer program which when executed by a computer results in performance of steps comprising:
receiving speech produced by a first sound source to obtain first speech signals for a plurality of channels by a plurality of microphones having one-to-one correspondence with the plurality of channels, the first sound source being either a human phonic organ or a loudspeaker;
calculating a first characteristic amount indicative of an inter-channel correlation of the first speech signals;
storing in advance a second characteristic amount in association with information, the second characteristic amount being indicative of an inter-channel correlation of second speech signals for the plurality of channels obtained by receiving speech produced by a second sound source by the plurality of microphones, the second source being either a human phonic organ or a loudspeaker, the information indicating that the second sound source is either the human phonic organ or the loudspeaker; and collating the first characteristic amount with the second characteristic amount to determine that the first sound source matches with either a human phonic organ or a loudspeaker based on inter-channel correlation of speech produced by a loudspeaker being greater than an inter-channel correlation of speech produced by a human phonic organ.

19. A speech processing apparatus comprising:

a plurality of microphones which receive speech produced by a first sound source to obtain first speech signals for a plurality of channels having one-to-one correspondence with the plurality of microphones;

a calculation unit configured to calculate a first characteristic amount indicative of an inter-channel correlation of the first speech signals;

a storage unit configured to store in advance a second characteristic amount indicative of an inter-channel correlation of second speech signals for the plurality of channels obtained by receiving speech produced by a second sound source by the plurality of microphones; and a collation unit configured to collate the first characteristic amount with the second characteristic amount to determine whether the first sound source matches with the second sound source;

wherein the second sound source is a human phonic organ;

the storage unit further stores a third characteristic amount indicative of an inter-channel correlation third speech signals for the plurality of channels obtained by receiving recorded speech reproduced by a loudspeaker by the plurality of microphones, and the collation unit further collates the first characteristic amount with the third characteristic amount, and determines that the first sound source matches with the second sound source when the first characteristic amount is close to the second characteristic amount rather than the third characteristic amount.

20. A speech processing apparatus comprising:

a plurality of microphones which receive speech produced by a first sound source to obtain first speech signals for a plurality of channels having one-to-one correspondence with the plurality of microphones;

a calculation unit configured to calculate a first characteristic amount indicative of an inter-channel correlation of the first speech signals;

a storage unit configured to store in advance a second characteristic amount indicative of an inter-channel correlation of second speech signals for the plurality of channels obtained by receiving speech produced by a second sound source by the plurality of microphones; and a collation unit configured to collate the first characteristic amount with the second characteristic amount to determine whether the first sound source matches with the second sound source;

wherein the second sound source is a phonic organ of a specific speaker;

the storage unit further stores a fourth characteristic amount indicative of an inter-channel correlation of fourth speech signals for the plurality of channels obtained by receiving speech produced by a phonic organ of a speaker different from the specific speaker by the plurality of microphones, and the collation unit further collates the first characteristic amount with the fourth characteristic amount, and determines that the first sound source matches with the second sound source when the first characteristic amount is close to the second characteristic amount rather than the fourth characteristic amount.

21. A speech processing apparatus comprising:

a plurality of microphones which receive speech produced by a first sound source to obtain first speech signals for a plurality of channels having one-to-one correspondence with the plurality of microphones;

a calculation unit configured to calculate a first characteristic amount indicative of an inter-channel correlation of the first speech signals;

a storage unit configured to store in advance a second characteristic amount indicative of an inter-channel correlation of second speech signals for the plurality of channels obtained by receiving speech produced by a second sound source by the plurality of microphones; and a collation unit configured to collate the first characteristic amount with the second characteristic amount to determine whether the first sound source matches with the second sound source;

wherein each of the first characteristic amount and the second characteristic amount is a power ratio between the plurality of channels.

* * * * *